US006973418B1

(12) United States Patent
Kirshenbaum

(10) Patent No.: US 6,973,418 B1
(45) Date of Patent: Dec. 6, 2005

(54) MODELING DECISION-MAKER PREFERENCES USING EVOLUTION BASED ON SAMPLED PREFERENCES

(75) Inventor: Evan R. Kirshenbaum, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/544,751

(22) Filed: Apr. 7, 2000

(51) Int. Cl.[7] .......................... G06N 3/00; G06N 5/02; G06F 17/10
(52) U.S. Cl. .............................. 703/2; 706/13; 706/46
(58) Field of Search .............................. 703/2; 706/13, 706/46

(56) References Cited

U.S. PATENT DOCUMENTS 5,740,323 A * 4/1998 Nomura et al. ................ 706/13
6,591,257 B1 * 7/2003 Martinka et al. ............. 706/46

OTHER PUBLICATIONS

Terano et al.; Marketing data analysis using inductive learning and genetic algorithms with interactive- and automated-phases IEEE Int Conf. Evolutionary Computation; pp. 771-776; 1995.*

* cited by examiner

*Primary Examiner*—Hugh Jones

(57) ABSTRACT

Techniques for modeling the preferences of a decision-maker using sampled pair-wise preferences involve identifying a set of alternatives to be presented to the decision-maker and identifying a set of attributes associated the alternatives. The alternatives are each characterized by a set of values for the attributes. A sample set of pair-wise preferences among a subset of the alternatives is obtained and a model of preferences is generated by iteratively generating a set of candidate models and evaluating the candidate models using a fitness measure which is based on the sample set of pair-wise preferences. The models may take into account character attributes associated with potential decision-makers.

38 Claims, 6 Drawing Sheets

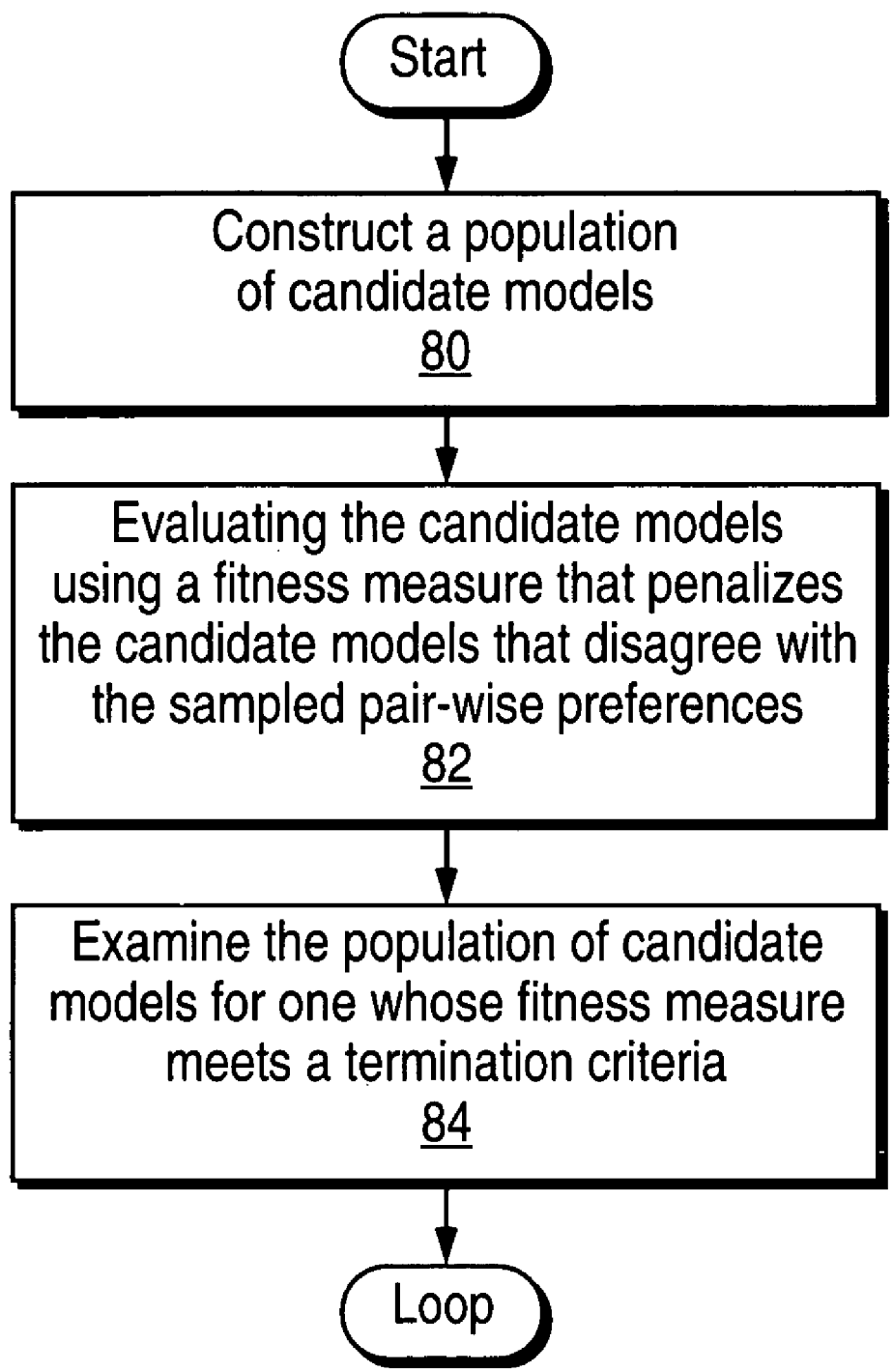

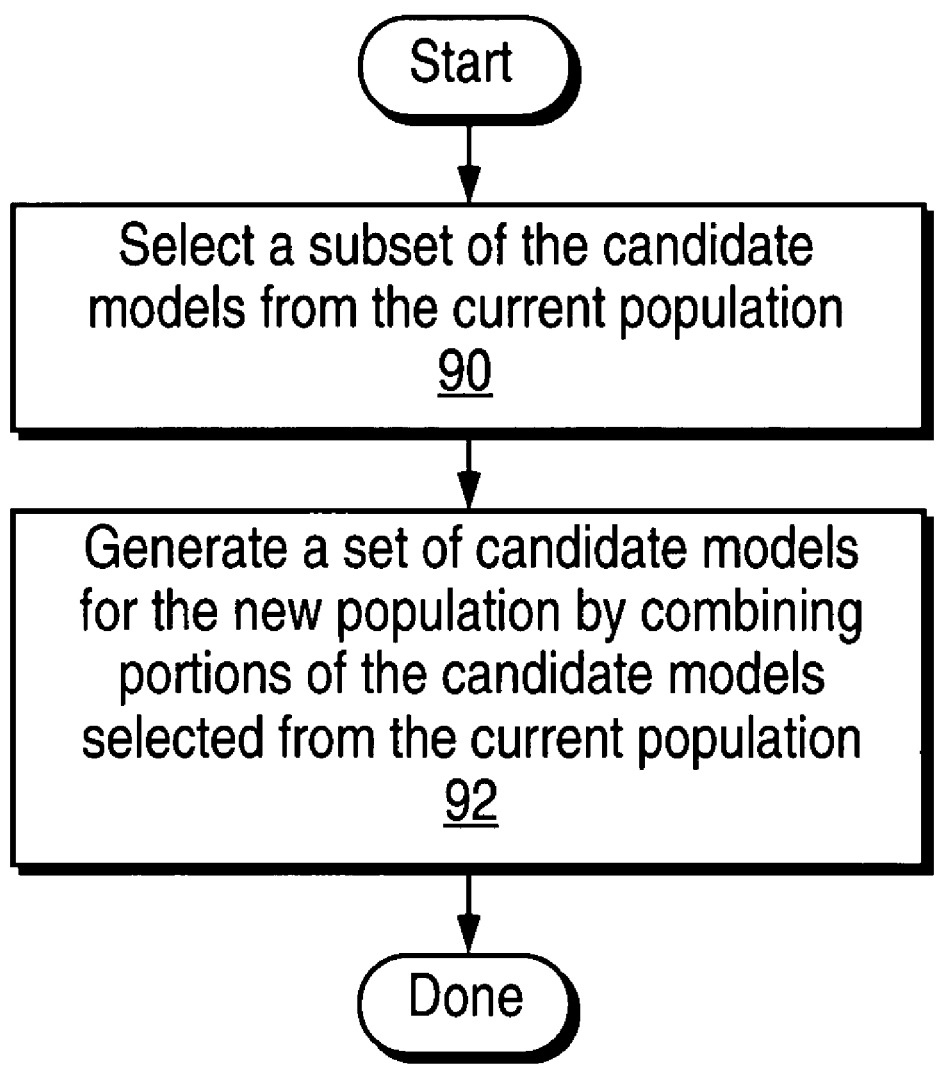

MODELING DECISION-MAKER PREFERENCES USING EVOLUTION BASED ON SAMPLED PREFERENCES

BACKGROUND OF THE INVENTION

1. Field of Invention

The present invention pertains to the field of decision analysis. More particularly, this invention relates to modeling decision-maker preferences.

2. Art Background

A variety of problems commonly involve making choices among available alternatives. Such choices usually involve tradeoffs among the available alternatives. For example, an alternative may be better in terms of one dimension such as speed, privacy, or purchase price, etc and worse in terms of another dimension such as footprint, recency of data, or proximity to customers, etc. An analysis of a choice among available alternatives commonly involves an analysis of tradeoffs along many different dimensions.

Prior techniques for making choices among available alternatives commonly involve a determination of an optimal linear weighting for the values of the various dimensions. Unfortunately, it is often not clear how to optimize with respect to any given dimension. In addition, it is often the case that the desirability of an alternative is contingent on a combination of several different dimensions. As a consequence, the determination of an optimal choice among the available alternatives is typically a major activity that is generally reserved for major decisions which are made infrequently.

Prior techniques for making choices among available alternatives may involve eliciting a quantitative estimate from decision-makers as to the relative importance of different dimensions. Unfortunately, decision-makers are typically not proficient at assigning such quantitative estimates. For example, it is usually not clear to a decision-maker whether the cost of an alternative is twice, or three times, etc., as important as the throughput yielded by the alternative. As a consequence, prior techniques which take into account such quantitative estimates are subject to errors.

SUMMARY OF THE INVENTION

Techniques are disclosed for modeling the preferences of a decision-maker using sampled pair-wise preferences. These techniques involve identifying a set of alternatives to be presented to the decision-maker and identifying a set of attributes associated with the alternatives. The alternatives are each characterized by a set of values for the attributes. A sample set of pair-wise preferences among a subset of the alternatives is obtained and a model of preferences is generated by iteratively generating a set of candidate models and evaluating the candidate models using a fitness measure which is based on the sample set of pair-wise preferences. The models may take into account characterization attributes associated with potential decision-makers. For example, the decision maker 14 has an associated set of characterization attributes 60–62.

The preference models yielded by these techniques may be used in a wide variety of systems and devices to render choices among available alternatives while automatically taking into account the modeled preferences of the relevant decision makers. Such systems include presentation systems including those used in business and e-commerce as well and product support systems, software distribution systems, web server systems including e-commerce web servers. In addition, preference models yielded by these techniques may be used in systems and devices which render such choices on behalf of particular decision-makers. Such systems include web agents and may include hand-held devices and/or mechanisms implemented in software on computer systems.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 3 shows steps involved in evolving a preference model using genetic programming techniques;

FIG. 4 shows steps involved in constructing a new population of candidate models from the current population of candidate models;

DETAILED DESCRIPTION

Figure 1:
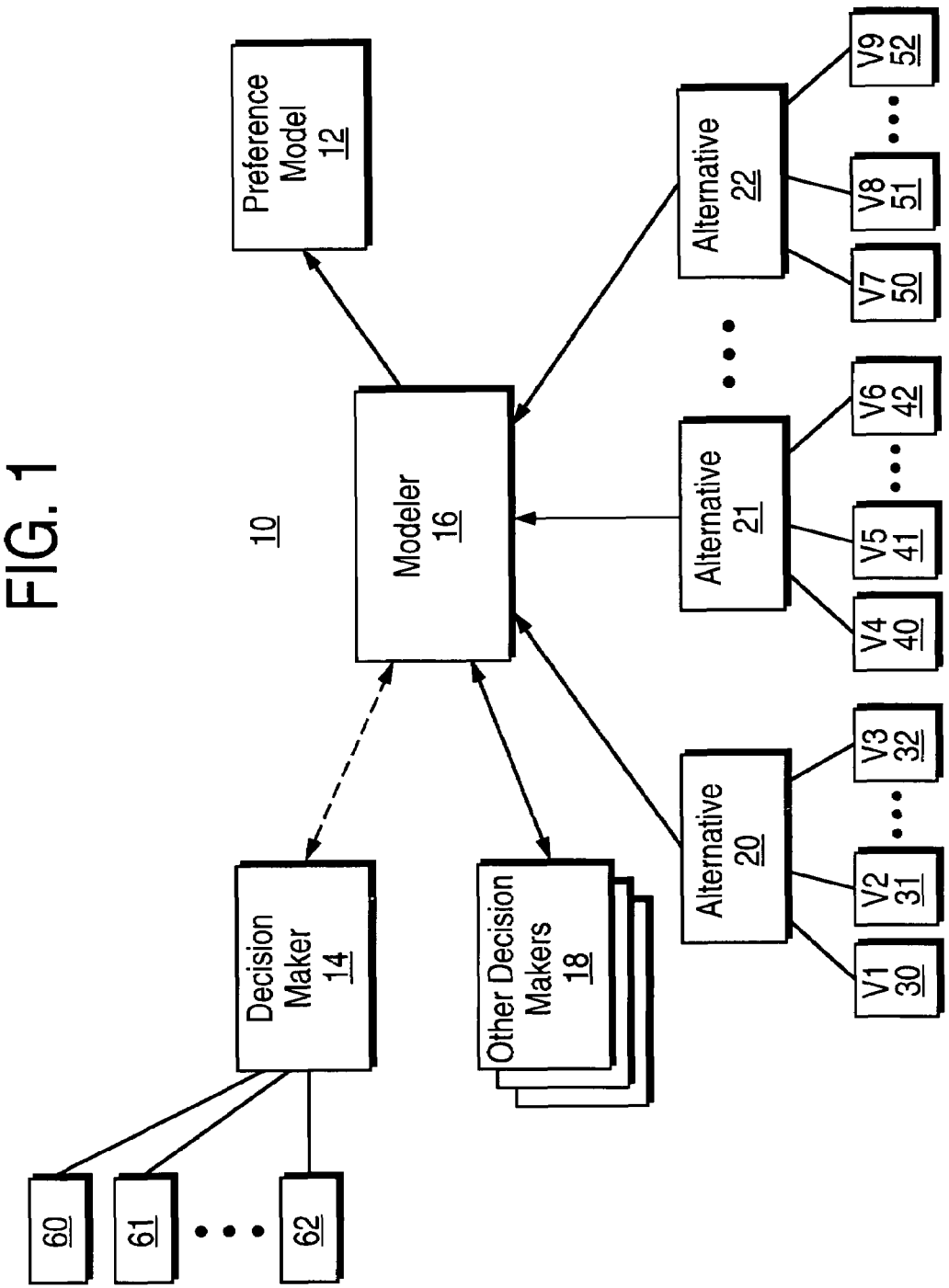
FIG. 1 shows a system for generating a preference model according to the present techniques.

FIG. 1 shows a system 10 for generating a preference model 12 according to the present techniques. The preference model 12 is a model of the preferences of a decision-maker 14 with respect to a set of alternatives 20–22. The alternatives 20–22 have corresponding sets of attributes 30–32, 40–42, and 50–52, respectively. The alternatives 20–22 differ by the values v1–v3, v4–v6, and v7–v9 assigned to the attributes 30–32, 40–42, and 50–52, respectively. The preference model 12 is generated by a modeler 16. The modeler 16 takes as input information from the decision-maker 14 and/or a set of other decision-makers 18.

The decision-maker 14 may be a human being or a non-human animal. Likewise, the other decision-makers 18 may be human beings or non-human animals.

The preference model 12 once generated may be used to determine or predict the preferences of the decision-maker 14 or groups of decision-makers with respect to any combination of the alternatives 20–22 or of alternatives having similar attributes. Numerous applications and uses of the preference model 12 are possible.

For example, the alternatives 20–22 may be different alternatives of similar available products which are characterized by different set of values for the attributes of price, brand name, size, packaging, etc. In this case, the preference model 12 may be used to predict which of the available products the decision-maker 14 is likely to select. This information may be used to determine appropriate products to display on brick-and-mortar store shelves or e-commerce web pages. This information may also be used by a web agent or device with similar functionality that shops in an automatic fashion on behalf of the decision-maker 14.

In another example, the alternatives 20–22 may be different web site designs which are characterized by different sets of values for the attributes of graphical or multimedia content, and/or level of technical content, etc. This information may be used by a web server to adapt a web browsing experience to the preferences of the decision-maker 14 or groups of decision-makers.

Figure 2:
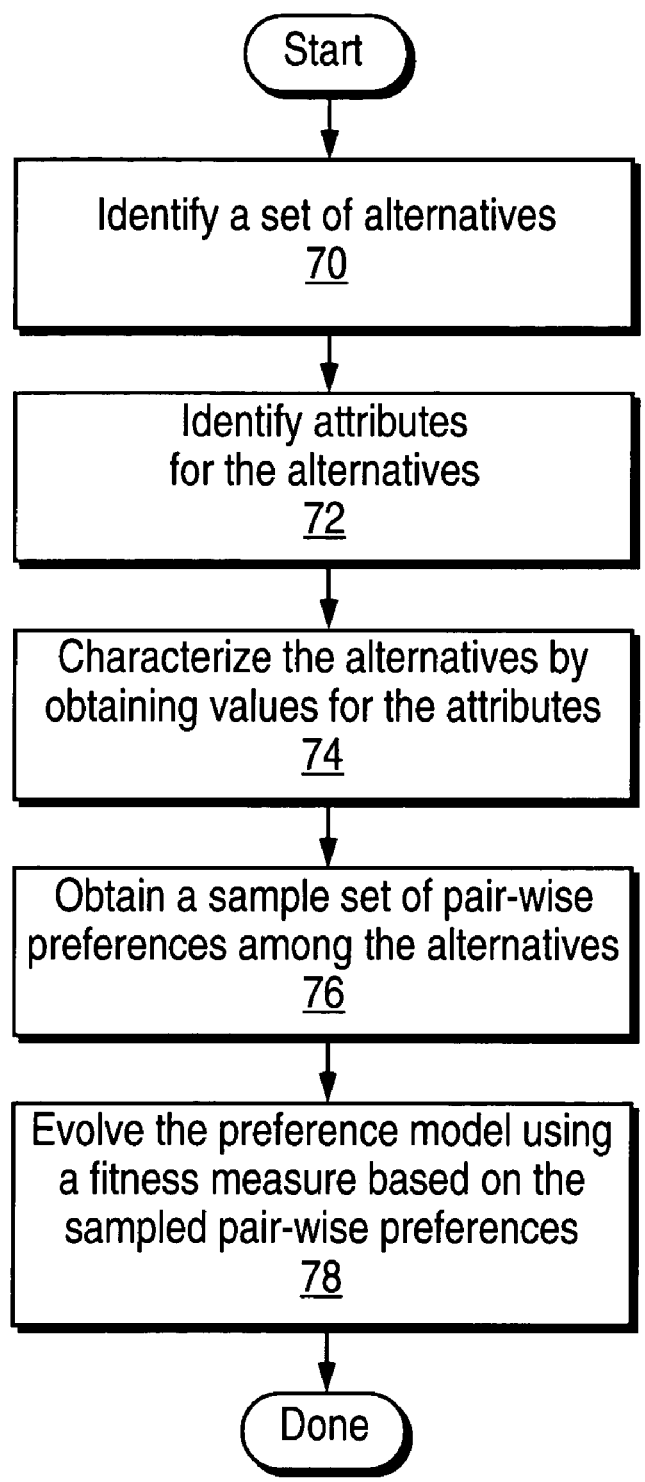
FIG. 2 shows steps involved in generating a preference model from sample pair-wise preferences.

FIG. 2 shows a method used in the system 10 to generate the preference model 12. At step 70, a set of alternatives for which the preferences of the decision-maker 14 are to be modeled are identified. These are represented as the alternatives 20–22. The number and nature of the alternatives 20–22 are generally application specific. The alternatives 20–22 may be products, services, web page and/or web site designs, store front designs, store shelf arrangements, facility site selections, foods, food types, movies, plays, music, or anything that may be conceivably be subject to choices or preferences associated with the decision-maker 14.

At step 72, a set of attributes for the alternatives 20–22 are identified. These are represented as the attributes 30–32, 40–42, and 50–52, respectively. Again, the number and nature of the attributes 30–32, 40–42, and 50–52 are generally application-specific. For example, products may have price, size, brand name, etc. attributes, movies may have price, genre, MPAA rating, etc. attributes, and web page designs may have types of products, price range for products, etc. attributes.

At step 74, the alternatives 20–22 are characterized by obtaining a set of values for the corresponding attributes 30–32, 40–42, and 50–52. These are the values $v1$–$v3$, $v4$–$v6$, and $v7$–$v9$ shown and may be obtained in a variety of ways. For example, the values may be randomly generated over an appropriate space. Producers or distributors may provide price, size values, etc. for attributes associated with products. A web designer may provide values for the attributes of web pages and web sites. Professional critics may provide values for the attributes associated with movies or plays. In addition, values for attributes may be obtained by observation.

At step 76, a sample set of pair-wise preferences among the alternatives 20–22 is obtained. The sample set of pair-wise preferences may be obtained from the decision-maker 14 or the other decision-makers 18 or any combination of the decision-maker 14 and the other decision-makers 18. The pair-wise preferences may be obtained by common agreement among the involved decision-makers. The agreement may be obtained by polling the involved decision-makers.

The alternatives 20–22 may be realized alternatives and a relative preference between two successive realized alternatives experienced by the appropriate decision-maker may be obtained at step 76.

Alternatively, the appropriate decision-maker may be presented with the alternatives at step 76 and a behavior of the decision-maker in response to the alternatives may be observed to obtain the sample set of pair-wise preferences.

For example, the decision-maker 14 may prefer the alternative 21 over the alternative 22 and may prefer the alternative 20 over the alternative 22 and may prefer the alternative 21 over the alternative 20. This may be expressed as the following (example sample set of pair-wise preferences):

B>C
A>C
B>A where A is alternative 20, B is alternative 21, and C is the alternative 22. This may be viewed as B having greater utility than C, A having greater utility than C, and B having greater utility than A.

The sample set of pair-wise preferences may be obtained by presenting the alternatives in actual or graphical or textual description form to the decision-maker 14 and obtaining from the decision-maker 14 a ranking of the alternatives.

At step 78, the preference model 12 is evolved using a fitness measure which is based on the sample set of pair-wise preferences obtained at step 76. Step 78 in one embodiment is performed using genetic programming techniques.

FIG. 3 shows steps involved in evolving the preference model 12 using genetic programming techniques in one embodiment. At step 80, a population of the candidate models is constructed. Each candidate model is capable of expressing a modeled pair-wise preference between any two of the alternatives 20–22 in response to the corresponding values $v1$–$v3$, $v4$–$v6$, and $v7$–$v9$ assigned to the corresponding attributes, 30–32, 40–42, and 50–52.

The candidate models may be computer programs. The computer programs may each be represented as a tree or as a sequence of computer instructions or in any other manner that may be used to represent computer programs. Alternatively, the candidate models may be mathematical expressions each represented as a tree. In other alternatives, the candidate models are neural networks or belief networks.

In one embodiment, the candidate models express a modeled pair-wise preference by returning a number representing a utility value for each alternative. An example candidate model may return the following (example utility values) for alternatives A, B, and C:

A=0.5
B=0.4
C=0.01

At step 82, the candidate models from the population are evaluated using a fitness measure that penalizes the candidate models for disagreeing with the sample set of pair-wise preferences obtained at step 76. The candidate models from the population are evaluated by examining the modeled pair-wise preferences of each candidate model over a subset of the alternatives 20–22 and deriving a fitness measure which includes at least one criterion that penalizes a candidate model when the modeled pair-wise preferences it yields disagree with the sample set of pair-wise preferences.

The criterion that penalizes a candidate model may be based on a number of the sample set of pair-wise preferences obtained at step 76 that disagree with the modeled pair-wise preferences yielded by the candidate model. The example utility values A=0.5, B=0.4, C=0.01 correspond to the example modeled pair-wise preferences A>B, A>C, and B>C. The candidate model that generated the example modeled pair-wise preferences is penalized by one for not agreeing with the preference B>A in the example sample set of pair-wise preferences shown above.

In some embodiments, the sample set of pair-wise preferences are obtained with an indication of preference strength. In such embodiments, the penalty for disagreeing with the sample set of pair-wise preferences is based on the indications of preference strength.

At step 84, the population of candidate models is examined for a candidate model whose fitness measure meets a termination criterion. The termination criteria may be based on any determination on what is a good enough candidate model to be used as the preference model 12. The accuracy to which the selected candidate model agrees with the sample set of pair-wise preferences is freely selectable.

The step of evolving (step 78) continues by constructing a new population of candidate models and repeating steps 80–84 for the new population. This loop of constructing new populations and repeating steps 80–84 for each new population continues until a candidate model is found that meets the termination criterion.

FIG. 4 shows the steps involved in constructing a new population of candidate models from a current population of candidate models. At step 90, a subset of the candidate models from the current population is selected based on the fitness measures. For example, the subset of candidate models having fitness measures that agree most closely with the sample set of pair-wise preferences may be selected at step 90. At step 92, a set of candidate models for a new population is generated by combining portions the candidate models selected at step 92. The selected candidate models may be combined using operations which are modeled on the genetic operations of mutation and/or cross-over.

Figure 5B:
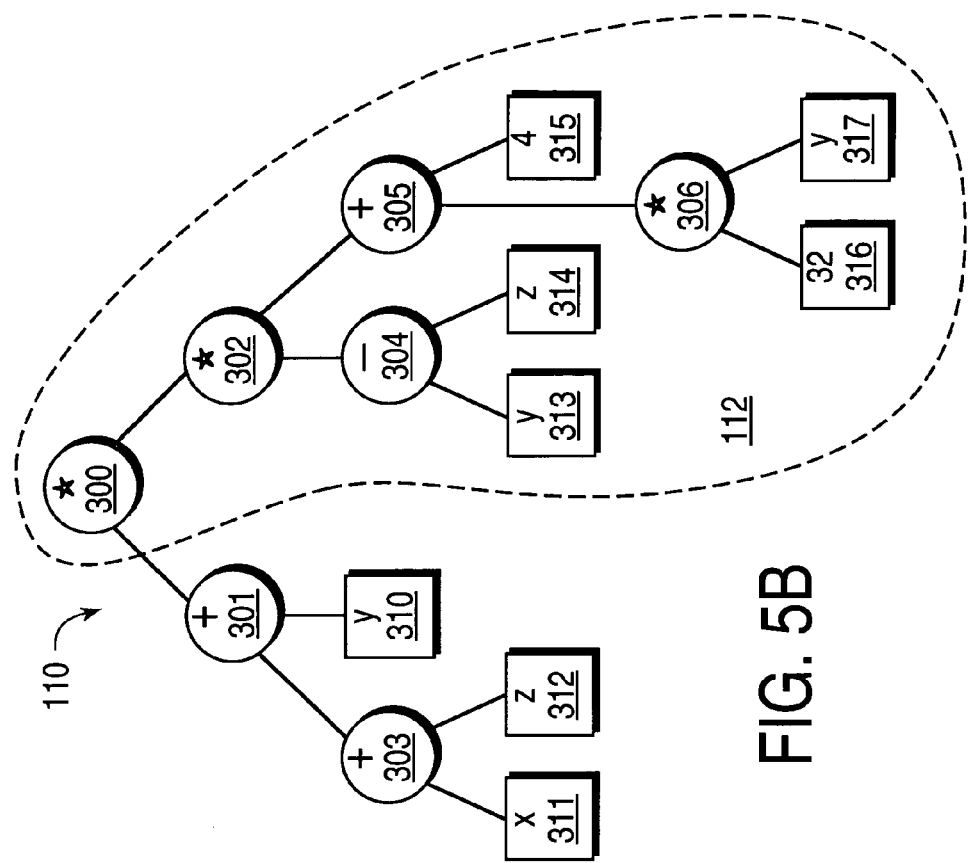
FIGS. 5a–5c show a new candidate model which is generated by combining a pair of candidate models of a current population.
Figure 5A:
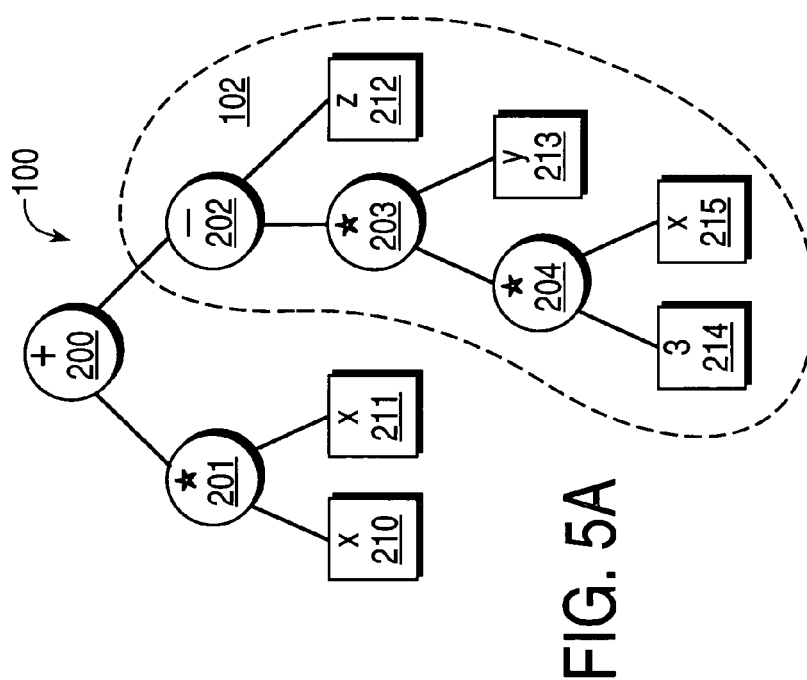
Figure 5C:
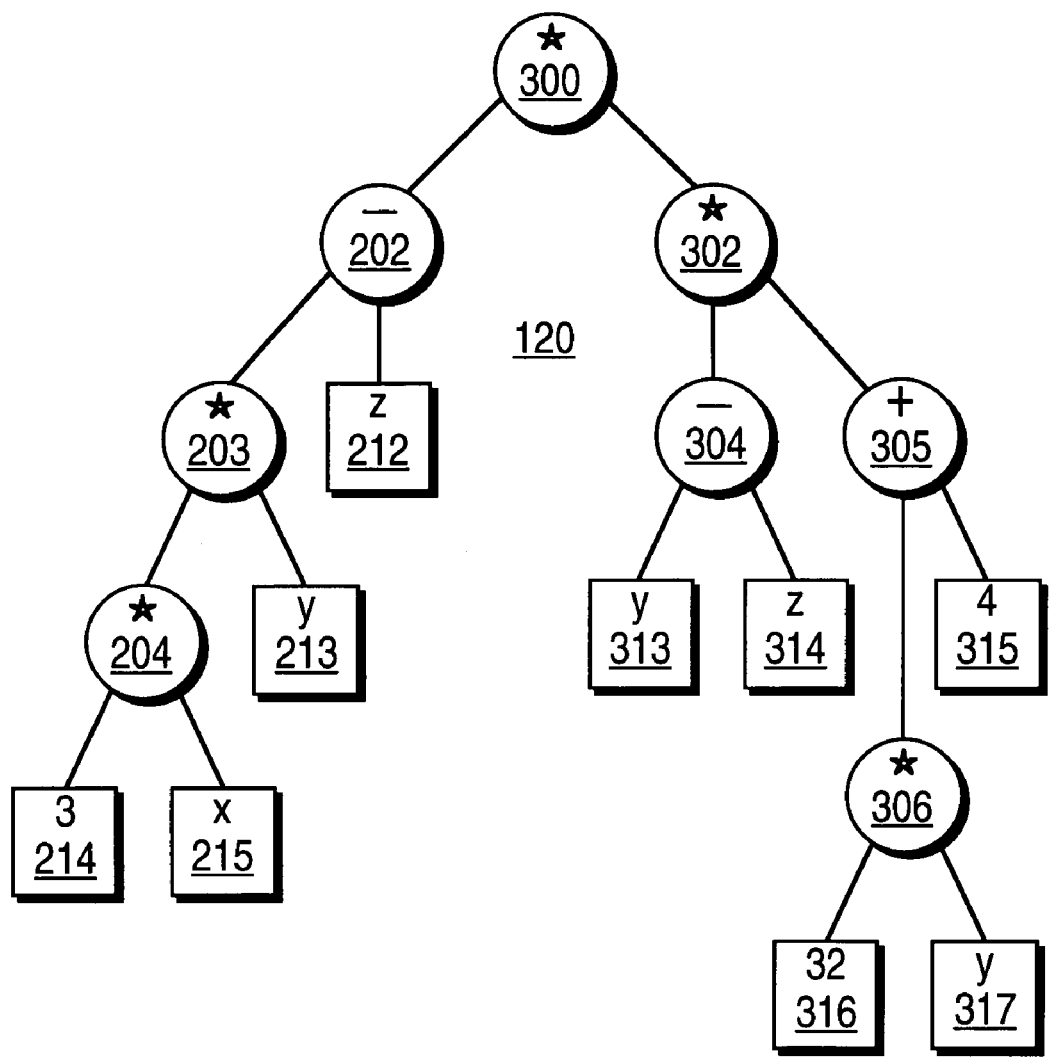

FIGS. 5a–5c show a new candidate model 120 which is generated by combining a pair of candidate models 100 and 110 of a current population. In this example, the candidate models 100 and 110 each provide a tree arrangement of nodes that represents a mathematical function involving variables x, y, and z. The variables x, y, and z represent values for the attributes associated with the alternatives 20–22.

The candidate model 100 includes an arrangement of operator nodes 200–204 and input nodes 210–215. The operator nodes 200–204 specify add, multiply, subtract, subtract, and multiply operators, respectively. The input nodes 210–215 specify x, x, z, y, a constant value equal to 3, and x inputs, respectively. The candidate model 100 provides a tree representation of the mathematical function $f(x, y, z)=x^2+3xy-z$. The candidate model 110 includes an arrangement of operator nodes 300–306 and input nodes 310–317 that represents the mathematical function $f(x, y, z)=(x+z+y)(y-z)(32y+4)$.

The new candidate model 120 is formed by cutting the operator nodes 300, 302, and 304–306 and the input nodes 313–317 from the candidate model 110 and combining them with the operators nodes 202–204 and input nodes 212–215 which are cut from the candidate model 100. The new candidate model 120 represents the mathematical function $f(x, y, z)=(3xy-z)(y-z)(32y+4)$.

In an alternative embodiment, the preference model 12 may take into account characteristics associated with decision-makers. A method in the system 10 for generating the preference model 12 in the alternative embodiment includes a step of identifying a set of characterization attributes that may be associated with the decision-maker 14 and a step of obtaining a sample set of values for the characterization attributes from the decision-makers from which the sample set of pair-wise preferences are obtained at step 76. The step of obtaining the sample values for the characterization attributes may be performed using a set of multiple choice questions which are presented to the appropriate decision-makers.

The step 80 of constructing a population of candidate models in the alternative embodiment involves constructing candidate model each capable of expressing a modeled pair-wise preference between any two of the alternatives in response to the values for the attributes as well as the values for the characterization attributes. For example, candidate models which are mathematical functions such as those described above are functions of c1, c2, through cn as well as x, y, and z, i.e. f(x, y, z, c1, c2 . . . cn) in the alternative embodiment.

The step 82 of evaluating the candidate models in the alternative embodiment involve examining the modeled pair-wise preferences of each candidate model over a subset of the alternatives and decision-makers and deriving a fitness measure which includes at least one criterion that penalizes the candidate models for disagreeing with the combination of the sample set of pair-wise preferences and corresponding sample values for the characterization attributes.

A system 10 may be incorporated into a system for designing a presentation. This enables design of the presentation by selecting between available alternatives. In such systems, the preference model 12 is constructed for a particular target audience using the techniques described herein.

The presentation may be customized for a specific member of the target audience. For example, the specific member of the target audience is characterized by values for the characterization attributes described above. Alternatively, the presentation may be designed to appeal to the target audience as a whole by considering the expected average preference of the members of the audience.

An example of a presentation is a web page. Another example of a presentation is an advertisement. Another example of a presentation is a direct-marketing solicitation. Still another example of a presentation is a product or service offered for sale and the alternatives involve selection among feature combinations, ingredients, compositions, configurations, and/or packaging. Another example of a presentation is the establishment of the price of a product or service offered for sale. Yet another example of a presentation is a shelf layout or display in a store.

Another example of a presentation is a set of one or more products or services offered for sale. This includes a presentation of a single product or a single service as well as a presentation of a bundle of products or a bundle of services. The presentation of a product or a bundle of products or a service or a bundle of services may include price, composition, packaging and/or other characteristics of the products or services offered for sale.

Yet another example of a presentation is a sequence of questions or actions. The sequence may be steps to diagnose a problem. Examples of problem diagnosis are numerous and include software and hardware problem diagnosis as well as problem diagnosis in mechanical or other systems as well as behaviors. Examples of a step used in diagnosing a problem include a question, an action, a measurement, etc.

The present techniques enable a diagnostic system to adapt its presentation of questions, actions, measurements, etc., to the modeled preferences of a user. For example, some users may prefer technically oriented questions while others may not. As another example, different users tend to have different levels of knowledge of the system being diagnosed and different preferences on the technical content of questions. Some users may prefer visually oriented diagnostic steps while others may prefer text oriented questions.

The sequence of steps may be probabilistically weighted based on the likelihood of specific results of the steps in the sequence. The penalties are weighted accordingly.

The modeler 16 or system for designing a presentation which is based on the modeler 16 may be embodied as a physical device. The device may include processing means for performing the above described method steps and input means such as a keypad, touch-pad, voice input or any conceivable input mechanism. The input means allows a user to enter the observable attributes of the alternatives into the device. Alternatively, the observable attributes of the alternatives may obtained by physical measurements carried out by the device. The means in the device for obtaining physical measurements may be any conceivable measurement means such as bar-code readers, temperature sensors, or other types of sensors, etc. The device may include any type of storage means such as memory for storing the preference model 12.

The modeler 16 or system for designing a presentation which is based on the modeler 16 may be embodied as a computer program or as a web-based service executing on one or more computer systems, possibly networked, or other types of devices with processing resources. The alternatives 20–22 may represent one or more products or services offered for sale by one or more suppliers. The products or services may be offered for sale over a computer network. The alternatives 20–22 may represent taking or not taking an action. The action may be the installation of software on a computer system.

The alternatives 20–22 may represent ways of customizing a product or service. The product or service may a computer program. The product or service may be obtained over a computer network. The customization options may reflect different available degrees of quality of service including, for example, price, security, privacy, reliability etc., as well as performance.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for generating a model of preferences of a decision-maker, comprising the steps of:
    identifying a set of alternatives to be presented to the decision-maker;
    identifying a set of attributes associated with the alternatives;
    characterizing the alternatives by obtaining a set of values for the attributes of each alternative;
    obtaining a sample set of pair-wise preferences among a subset of the alternatives;
    evolving the model of preferences that is stored in memory by iteratively generating a set of candidate models and evaluating the candidate models using a fitness measure which is based on the sample set of pair-wise preferences.

2. The method of claim 1, wherein the step of evolving includes the steps of:
    constructing a population of the candidate models, each candidate model capable of expressing a modeled pair-wise preference between any two of the alternatives in response to the values for the attributes;
    evaluating the candidate models from the population by examining the modeled pair-wise preferences of each candidate model over a subset of the alternatives and deriving a fitness measure which includes at least one criterion that penalizes the candidate models for disagreeing with the sample set of pair-wise preferences;
    examining the population for one whose fitness measure meets a termination criterion.

3. The method of claim 2, wherein the criterion penalizes the candidate models based on a number of the sample set of pair-wise preferences that disagree with the modeled pair-wise preferences.

4. The method of claim 2, wherein the step of obtaining a sample set of pair-wise preferences includes the steps of obtaining an indication of preference strength of the decision-maker such that the penalty for disagreeing with the sample set of pair-wise preferences is based on the indication of preference strength of the decision-maker.

5. The method of claim 2, wherein the candidate models each express the modeled pair-wise preferences by returning a number representing a utility value.

6. The method of claim 2, wherein the candidate models are each of a type from a set that includes a computer program type, a mathematical expression type, a neural network type, and a belief network type.

7. The method of claim 2, wherein the step of evolving further includes the step of constructing a new population from the population based on the fitness measures of the candidate models.

8. The method of claim 7, wherein the step of constructing a new population includes the steps of:
    selecting a subset of the candidate models based on the fitness measures;
    generating a set of new candidate models for the new population based on combining portions the selected subset of candidate models.

9. The method of claim 8, wherein the step of generating a set of new candidate models includes the step of combining portions the selected subset of candidate models using genetic operations.

10. The method of claim 1, wherein the step of obtaining the sample set of pair-wise preferences comprises the step of obtaining the sample set of pair-wise preferences comprises the step of obtaining the sample set of pair-wise preferences from the decision maker.

11. The method of claim 1, wherein the step of obtaining the sample set of pair-wise preferences comprises the step of obtaining the sample set of pair-wise preferences from a set of one or more other decision-makers.

12. The method of claim 11, wherein the step of obtaining the sample set of pair-wise preferences from the other decision-makers includes the step of obtaining a common agreement among the other decision-makers for the sample set of pair-wise preferences.

13. The method of claim 1, further comprising the step of:
    identifying a set of characterization attributes associated with the decision-maker;
    obtaining a set of values for the characterization attributes from a set of sample decision-makers from which the sample set of pair-wise preferences are obtained.

14. The method of claim 13, wherein the step of obtaining a set of values for the characterization attributes comprises the step of obtaining from the decision-maker a set of answers to a set of multiple choice questions.

15. The method of claim 13, wherein the step of evolving includes the steps of:
    constructing a population of the candidate models, each candidate model capable of expressing a modeled pair-wise preference between any two of the alternatives in response to the values for the attributes and the values for the characterization attributes;
    evaluating the candidate models from the population by examining the modeled pair-wise preferences of each candidate model over a subset of the alternatives and sample decision-makers and deriving a fitness measure which includes at least one criterion that penalizes the candidate models for disagreeing with the sample set of pair-wise preferences and corresponding values for the characterization attributes;
    examining the population for one whose fitness measure meets a termination criterion.

16. The method of claim 1, wherein the step of obtaining a sample set of pair-wise preferences includes the steps of presenting the alternatives to the decision-maker and obtaining from the decision-maker a ranking of the alternatives.

17. The method of claim 1, wherein the steps of obtaining a sample set of pair-wise preferences comprises the step of presenting a textual description of each alternative.

18. The method of claim 1, wherein the step of identifying a set of alternatives comprises the step of selecting from a set of realized alternatives.

19. The method of claim 18, wherein the step of obtaining a sample set of pair-wise preferences comprises the step of obtaining from the decision-maker a relative preference between two successive realized alternatives experienced by the decision maker.

20. The method of claim 1, wherein the step of obtaining a sample set of pair-wise preferences comprises the step of presenting the decision-maker with the alternatives and observing a behavior of the decision-maker in response to the alternatives.

21. A system for designing a presentation comprising means for selecting between a set of available alternatives each characterized by a set of observable attributes using a model of preferences of a target audience wherein the model that is stored in memory is evolved by iteratively generating a set of candidate models and evaluating the candidate models using a fitness measure which is based on a sample set of pair-wise preferences based upon responses from the target audience to a series of questions.

22. The system of a claim 21, wherein the presentation is customized for a specific member of the target audience.

23. The system of claim 22, wherein the specific member of the target audience is characterized by a set of values of a set of characterization parameters used with the candidate models.

24. The system of claim 21, wherein the presentation is designed to appeal to the target audience as a whole.

25. The system of claim 21, wherein the presentation is one of a set that includes a web page, a sequence of question, an advertisement, a direct-marketing solicitation, a set of one or more services, a set of one or more products, an establishment of a price of a product, an establishment of a price of a product, an establishment of a price of a service, a shelf layout in a store, a display in a store, a sequence of actions, a sequence of steps used to diagnose a problem, a design of product, and a design of service.

26. A device for deciding among a set of alternatives each characterized by a set of observable attributes comprising means for storing a preference model constructed by iteratively generating a set of candidate models and evaluating the candidate models using a fitness measure which is based on a sample set of pair-wise preferences that are stored in memory.

27. The device of claim 26, further comprising input means that enable a user to enter the observable attributes of the alternatives into the device.

28. The device of claim 27, wherein the input means enable the user to enter a set of values for a set of characterization parameters of the user that are used with candidate models.

29. The device of claim 26, further comprising means for obtaining a set of physical measurements associated with the observable attributes.

30. The device of claim 26, wherein the alternatives each represent one from a set that includes one or more services offered for sale and one or more products offered for sale.

31. The device of claim 26, wherein the alternatives include taking an action and not taking an action.

32. The device of claim 26, wherein each alternative represents a way of customizing a service.

33. A method of customizing a computer program, the method comprising the acts of:
presenting a user with a plurality of pairs of customization options through a series of questions;
generating the user's preferences for each pair of options in the plurality in response to the user's answers to the series of questions;
assigning a plurality of values to each element of each pair of options in the plurality;
evaluating a fitness measure for each of the plurality of values;
selecting a subset from the plurality of values, wherein each member of the subset exceeds the fitness measure; and
combining the members of the subset using genetic operations to produce new values for each element of each pair of options in the plurality.

34. The method of claim 33, wherein the customization options include the level of technical expertise required to operate the program.

35. The method of claim 33, wherein the act of presenting the user with the plurality of pairs occurs over a computer network.

36. The method of claim 33, wherein the genetic operations are chosen from the group consisting of mutation and cross-over.

37. The method of claim 33, wherein the act of evaluating the fitness measure for each of a plurality of values further comprises the act of reducing each value if the value violates the generated user preference.

38. The method of claim 1, wherein the step of obtaining a sample set of pair-wise preferences includes performing a survey of likely decision-makers.

\* \* \* \* \*